३,१०२,०७६
THERMYCETIN AND METHOD FOR PREPARATION
Brinton M. Miller, Middletown, and Irving Putter, Martinsville, N.J., assignors to Merck & Co., Inc., Rahway, N.J., a corporation of New Jersey
Filed Apr. 12, 1962, Ser. No. 188,611
11 Claims. (Cl. 167—65)

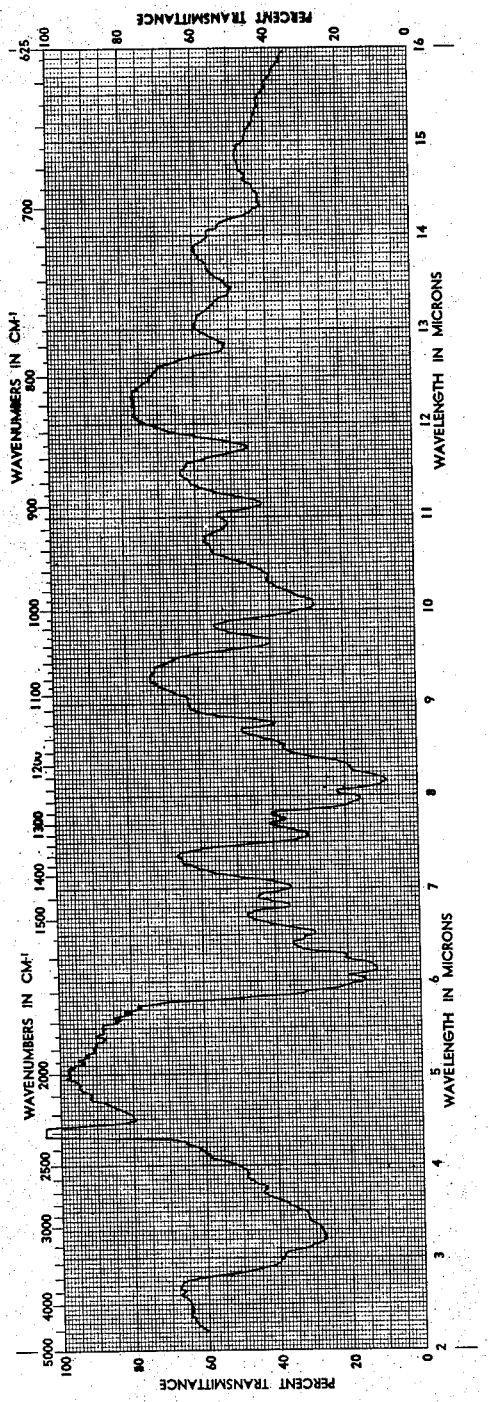

This invention relates to new antibiotic agents and processes of preparing the same. More particularly, it is concerned with a novel antibiotic substance, herein called thermycetin, and with processes for its production. This application is a continuation-in-part of co-pending U.S. application Serial Number 29,891, filed May 18, 1960, now abandoned.

The discovery of the remarkable antibiotic properties of penicillin stimulated great interest in this field which has resulted in the finding of many other valuable antibiotic substances such as: streptomycin, streptothricin, gramicidin, subtilin, bacitracin, chlortetracycline, oxytetracycline, terramycin, and the like. In general, such antibiotics are particularly active against certain gram negative bacteria, others are active against gram positive bacteria, and some are active against both gram negative and gram positive bacteria. However, the activity of these known antibiotics is usually limited to a few pathogenic microorganisms, and work has been continued in this field in an attempt to find other antibiotics which would be effective against other pathogens.

It is an object of the present invention to provide a new and useful antibiotic which is highly effective in inhibiting the growth of pathogenic bacteria, particularly the gram negative microorganisms. Another object is to provide a process of preparing this novel antibiotic substance by the fermentation of nutrient mediums with suitable strains of a heretofore unknown microorganism. A further object is to provide a process for recovering the antibiotic from fermentation broths. Other objects will be apparent from the detailed description hereinafter provided.

The new antibiotic substance of the present invention is formed by growing, under controlled conditions, a previously unknown species of microorganism which has been named Streptomyces sp. MA–568. The microorganism was isolated from a sample of soil collected in Jamaica, British West Indies. This new microorganism has been designated Streptomyces sp. MA–568 in the culture collection of Merck & Co., Inc., Rahway, New Jersey. A culture thereof has been deposited with the fermentation section of the Northern Utilization Research Branch, United States Department of Agriculture at Peoria, Illinois, and added to its permanent culture collection as NRRL 2824.

The morphological and cultural characteristics of Streptomyces sp. MA–568 are set forth in the following table:

Streptomcyes sp.—MA–568
Skim milk—Milk peptonized. Dark ring, gray sediment. Milk darkened, almost black. Reaction alkaline around pH 7.2.
Litmus milk—Milk peptonized, no ring formed. Spores gray, floating on surface of tube. Milk turned brown. Reaction neutral.
Gelatin—Thirty percent liquification in three weeks. Dark brown to almost black soluble pigment in medium. Spores cream-colored. Abundant cream-colored aerial mycelium floating on the surface of liquified gelatin.
Nitrate agar—Medium turned light brown. Aerial mycelium and spores cream-colored. Nitrates are not reduced to nitrites.
Hydrogen sulfide medium—Good vegetative growth on Difco peptone agar medium. Aerial mycelium and spores bluish-gray. Medium blackened ($H_2S$ test positive). Reverse black.
Tyrosine agar—Good vegetative growth. Aerial mycelium and spores gray. Reverse unchanged.
Ca-malate agar—Fair growth. Much raised colonies. With gray aerial mycelium and spores. Calcium not digested. Insoluble pigment.
Synthetic agar—Numerous small round colonies. Gray in color. Good aerial mycelial and spore growth. No soluble pigment. Reverse not changed. Small colonies radiate from a central point in a circular manner.
Oatmeal agar—Very good vegetative growth. Colonies coalesce to form a uniform surface growth with numerous spores and aerial mycelia. Colonies powdery. No soluble pigment. Reverse brown.
Citrate agar—Good vegetative growth. Aerial mycelium and spores almost white (very light grayish tint). Reverse unchanged. No soluble pigment.
Potato plug—Good vegetative growth. Colonies wrinkled and sink in the center with raised margins. Abundant aerial mycelium and spores, white to gray in color. Medium browned.
Dextrose-asparagine agar—Very good vegetative growth. Abundant aerial mycelium and spores. Spores gray in color. Colonies powdery medium slightly browned (light brown soluble pigment). Reverse dark brown. Earthy odor present.
Sabouraud's maltose agar — Good vegetative growth. Aerial mycelium and spores yellowish-gray. Soluble pigment black coffee-colored. Reverse black coffee-colored. Surface powdery.
Emerson's agar—Very good vegetative growth. Cream colored aerial mycelium and spores. Reverse light to dark brown.
Nutrient agar—Scant growth. Aerial mycelium and spores light cream-colored. Reverse light brown.
Bennett's agar—Excellent growth. Numerous spores, giving the surface of growth a very powdery appearance. Light brown soluble pigment. Reverse light to dark brown. Dark gray spores.
Starch agar—Good vegetative growth. Aerial mycelium and spores white. Surface of growth powdery. No soluble pigment. Reverse very light brown. Starch is not hydrolyzed.
Morphology—On dextrose-asparagine agar. Spores spherical $1.0\mu$ in diameter in short chains. Dark olive-colored, no spirals.

The above description of the microorganism-producing thermycetin is given as illustrative of suitable strains of Streptomyces which can be used in the production of thermycetin but it is to be understood that the present invention is not to be limited to organisms answering this particular description. The present invention also contemplates the use of other species of Streptomyces which are mutants of the described organism such as those obtained by natural selection, or those produced by mutating agent, for example, X-ray irradiataion, ultraviolet irradiation, nitrogen mustards, and the like.

The new antibiotic of the present invention is an acidic compound forming salts with bases. The free acid form of thermycetin possesses the following physical and chemical properties:

Thermycetin crystallizes in the form of white platelets melting at about 152–154° C. uncorrected with decomposition on the hot stage. The purity of these crystals as determined by phase stability methods in methanol was 98.2%.

It is easily soluble in alkaline solutions such as aqueous solutions of alkaline metal hydroxides, carbonates and bicarbonates, as well as in organic bases such as pyridine and the like. In addition, it is soluble in dioxane, glacial acetic acid and formamide. It is partly soluble in methanol, acetone, butanol, amyl acetate, methyl isobutyl ketone, and ethyl acetate and insoluble in water, petroleum ether and benzene.

It fails to give positive tests with Molisch, biuret, Somajii, Millon's, ninhydrin, Sakaguchi Benedict and Fehling reagents, but does give a positive color test with Tollen's reagent and with dinitrophenylhydrazine.

Solutions of thermycetin in 0.1 N HCl and 0.1 M pH 7.0 phosphate buffer and in 0.1 N sodium hydroxide after one hour give the following characteristic ultraviolet adsorptions:

| U.V.—0.1 N HCl | 0.1 M pH 7.0 PO$_4$ buffer | After 1 hour in 0.1 N NaOH |
| --- | --- | --- |
| 3,030$_{max}$.A. $E^{1\%}_{1\,cm.}$=1,178 | 3.020 A. $E^{1\%}_{1\,cm.}$=944 | 2,570 A. $E^{1\%}_{1\,cm.}$=1,420 |
| 2,790$_{inf}$.A. $E^{1\%}_{1\,cm.}$=999 | 2,730 A. $E^{1\%}_{1\,cm.}$=890 | |
| 2,330$_{max}$.A. $E^{1\%}_{1\,cm.}$=574 | 2,240 A. $E^{1\%}_{1\,cm.}$=697 | |

The infrared absorption spectrum of the antibiotic in a potassium bromide pellet using a sodium chloride prism is illustrated in the accompanying drawing. The more significant of the characteristic peaks occur at the following wave lengths expressed in microns: 2.9–4.0 (broad), 6.01, 6.12, 6.28, 6.46 (shoulder), 6.52, 6.82, 7.02, 7.57, 7.75, 7.95, 8.16, 8.30 (shoulder), 8.55, 8.79, 9.06 (shoulder), 9.66, 10.07, 10.37, 10.92, 11.14, 11.75, 12.80, 13.44 (broad), and 14.31.

Thermycetin contains the elements carbon, hydrogen, nitrogen and oxygen. The following is a analysis of the elemental composition obtained on a sample of crystalline product: carbon 38.1%, hydrogen 3.79%, nitrogen 16.2% and oxygen 41.6% (oxygen by direct analysis).

According to the microanalytical data, the elemental composition of thermycetin as well as its molecular formula is $C_{11}H_{13}N_4O_9$ (molecular weight 345). The calculated elemental composition for a compound of this composition is carbon 38.3%, hydrogen 3.77%, nitrogen 16.2% and oxygen 41.7%.

Upon titrating thermycetin with alkali, the calculated equivalent weight obtained is 171 with a pK of 4.5.

Thermycetin exhibits characteristic $R_f$ values in the following solvent systems:

70% isopropanol, $R_f$=0.54
20% NaCl in 75% MeOH, $R_f$=0.79
Butanol saturated with water, $R_f$=0.08
0.1 M phosphate buffer at pH 5.0 with methyl-isobutyl-ketone, $R_f$=0.60

Paper strip chromatograms developed in ethyl acetate-0.1 M phosphate buffer showed the following $R_f$ values at the indicated pH:

| pH | $R_f$ |
| --- | --- |
| 3.0 | 1.0 |
| 5.0 | 1.0 |
| 6.0 | 0.69 |
| 7.0 | 0.70 |
| 8.0 | 0.08 |
| 9.0 | 0.00 |

In aqueous solutions at pH greater than 9.0, the antibiotic is unstable. However, at pH 2–7 the product is stable for 24 hours at room temperature.

Thermycetin is active in inhibiting gram negative microorganisms primarily although it exhibts some activity against gram positive microorganisms. The following table shows the activity of the crystalline product against various microorganisms

| | 100 γ/ml. | 50 γ/ml. |
| --- | --- | --- |
| | Mm. | Mm. |
| Erwinia sp | 14 | 0 |
| Proteus vulgaris | 34 | 30 |
| Pseudomonas aeruginosa | 19 | 15 |
| Serratia marcescens | 18 | 0 |
| Staphylococcus aureus | 21 | 16 |
| Bacillus subtilis | 26 | 25 |
| Sarcina lutea | 30 | 0 |
| Escherichia coli W | 23 | 19 |

The antbiotic activity of thermycetin is determined by the agar diffusion method or the tube dilution method using *Escherichia coli* W as the test organism. The agar diffusion method is carried out as follows:

As flask containing 150 ml. of an assay medium composed of beef extract 0.3%, peptone 0.5%, yeast extract 0.2%, agar 1.5% and water to volume is sterilized by autoclaving for 20 minutes at 160° C. under 18 p.s.i. The liquid agar held at 45–50° C. is inoculated with 5 ml. of an overnight 37° C. nutrient broth culture of *E. coli* W which had been adjusted to a cell density of 60 on a Lumetron colorimeter using a 600 m$\mu$ filter. Five ml. of the seeded agar is then pipetted into a standard 90 mm. sterile plastic petri dish and allowed to solidify. Following solidification, the dish is refrigerated until use within the ensuing 24 hours.

In carrying out the assay, a standard 13 mm paper disc is soaked with the antibiotic solution and then tapped dry on paper toweling and placed on surface of *E. coli* W seeded agar plate. The plates are incubated at 25° for 18–24 hours. Antibiotic potency is then determined by measuring the zone or inhibition in millimeters of the growth of *E. coli* W around the disc.

The tube dilution assay is carried out as follows: Two milliliters of a solution made by adding 32 grams of Difco Phenol Red broth base and 20 grams of dextrose to 1000 ml. distilled water are added to a test tube. Nine other test tubes containing two milliliters each of the above solution diluted with 2 ml. of water are also prepared. Two milliliters of the antibiotic solution are added to the first tube and mixed. Two milliliters of the resultant solution are then transferred to the second tube and mixed. Two milliliters from this second tube are transferred to the third tube and mixed. This procedure is repeated to the tenth tube from which two milliliters of resulting solution are removed and discarded. To each of the ten tubes is added one drop of Lumetron 60 inoculum prepared as described above from a 5 ml. serological pipette. The tubes are then incubated in a water bath at 37° for approximately 2 hours until the control tube (one with half strength nutrients but no antibiotic) has turned from its original red color to a complete yellow. The 10-tube series is then examined and the tube with the highest dilution that is still red colored is considered to contain the minimal inhibitory concentration (MIC) of the antibiotic.

The new antibiotic of the present invention is produced by the aerobic fermentation of Streptomyces MA–568 in suitable aqueous mediums. Aqueous mediums such as those employed for the production of other antibiotics are suitable for the production of thermycetin. Such mediums contain sources of carbon and nitrogen assimilable by the microorganism and inorganic salts. In addition, the fermentation mediums contain traces of metal necessary for the growth of the micro-organism which are usually present in complex sources of carbon and nitrogen in the medium.

In general, carbohydrates such as sugars, for example, dextrose, sucrose, dextrin and the like, are suitable sources of assimilable carbon. The exact quantity of the carbon source will depend, in part, upon the other ingredients of the medium, but it is usually found that an amount of carbohydrate between about 1 and 6% by weight of the medium is satisfactory. These carbon sources can be used individually or several such sources may be combined in the medium.

Various nitrogen sources such as casein hydrolysates, amino acids, for example asparagine, glycine, argeninine, digests of soybean meal, soybean meal, distillers' solubles, and the like are readily assimilated by the thermycetin producing microorganisms and can be used in fermentation mediums for the production of this antibiotic. In general, we find that organic sources of nitrogen, particularly soybean meal, is very satisfactory for the production of the new antibiotic. The various organic and inorganic sources of nitrogen can be used either alone or in combination in amounts ranging from about 0.2 to about 6% by weight of the aqueous medium.

The following are examples of mediums suitable for growing Streptomyces MA–568 and producing thermycetin:

MEDIUM NO. 1

| | Percent |
|---|---|
| Dextrose | 1 |
| D-asparagine | 0.1 |
| $K_2HPO_4$ | 0.01 |
| $MgSO_4 \cdot 7H_2O$ | 0.05 |
| $FeSO_4 \cdot 7H_2O$ | 0.001 |
| Yeast extract | 0.05 |

MEDIUM NO. 2

| | |
|---|---|
| Extracted soybean meal | 3.0 |
| Dextrose | 2.0 |
| Distillers' solubles | 0.75 |
| Sodium chloride | 0.25 |

After preparing the aqueous mediums containing the above ingredients, the pH of the mediums is adjusted to about 7.0 to 7.5 prior to sterilization and inoculation.

The fermentation using the thermycetin producing strains of microorganisms can be carried out at temperatures ranging from about 24–30° C.

After completion of the fermentation, the antibiotic is conveniently recovered by acidifying the broth to a pH of about 3, filtering the acidified broth, extracting the filtered acidified broth with a suitable solvent for the antibiotic and evaporating the solvent extract. Solvents suitable for extracting the antibiotic that might be mentioned are ethyl acetate, butanol, amyl acetate, methyl isobutyl ketone, and the like. Thus, the antibiotic is readily recovered by extracting the filtered broth with ethyl acetate and evaporating the ethyl acetate to a small volume whereupon thermycetin crystallizes out and can be recovered in solid form pursuant to methods well known in the art.

The example which follows is presented as illustrative of fermentation and recovery methods useful in the production of thermycetin.

*Example*

A. *Fermentation.*—A medium containing 3% extracted soybean meal, 2% dextrose, 0.75% distillers' solubles and 0.25% sodium chloride was made up in tap water and adjusted to a pH of 7.5 with sodium hydroxide. About 3.5 liters of this medium was placed in a glass 5 l. fermentor and the flask and its contents sterilized by heating at 120° C. for one half hour in an autoclave. The sterilized medium was then inoculated with a negative culture of Streptomyces sp. MA–568 (NRRL 2824) prepared by growing this microorganism in 200 ml. of Difco nutrient broth containing 0.5% yeast extract and 1% dextrose at 28° C. for 24 hours.

The fermentation in the 5 l. fermentor was maintained at ° C.; the nutrient medium being agitated mechanically and by aeration at the rate of three liters per minute. During the fermentation the pH of the medium was recorded and adjusted automatically between 6.7 and 7.2 by the automatic addition of alkali or acid as required. The activity of the fermenting broth is followed by disc and tube dilution assays of the broth against *E. coli* by the procedures previously described. Activity appears in the broth after 12 hours and reaches its peak in 24–60 hours at which time the broth is harvested. Typical activities of harvested, filtered broth prepared in this manner and assayed against *E. coli* are: disc assay, 21–33 mm.; tube dilution assay; MIC (minimum inhibitory concentration); at 1:8 to 1:64 dilution of broth.

B. *Recovery.*—One hundred gallons of whole broth prepared as described above and containing 16.0 g. of thermycetin was acidified to pH 3.0 with hydrochloric acid and filtered through a plate and frame press precoated with Super-Cel.

The filtrate was extracted with 100 gal. of ethyl acetate and the extract concentrated under reduced pressure at a maximum temperature of 40° C. to 2 gallons. The concentrate was chilled to 0–5° C. and the crude crystals were removed by filtration. Yield 10.0 g.

The crude crystals were suspended in 500 ml. water and 2.5 N NaOH added until a pH of 7.5 was reached. The insolubles were removed by filtration. The filtrate was acidified to pH 4.0 with 2.5 N hydrochloric acid and the crystals were removed by filtration. The process was repeated twice more. The crystals were then dissolved in water with the aid of dilute alkali and crystallized by the addition of 36% acetic acid to pH 4.0. The crystals were removed by filtration, washed with water, then acetone and dried at 58° C. in vacuo. Yield 5.5 g. of crystalline thermycetin having a MIC versus *E. coli* W of 4 micrograms/ml.

Thermycetin and its salts are valuable antibacterial agents which, as has been shown above are active in inhibiting the growth of various gram negative and gram positive organisms. To date this antibiotic has not been proven to be useful in the treatment of humans. However, the antibiotic is useful in the preservation of fresh meats and in the isolation of microorganisms from soil samples. Thus, by adding a small amount of the antibiotic to the agar medium upon which soil samples are plated, the growth of many of the organisms contained in the soil is inhibited. This inhibition of the growth of many of the bacteria such as *E. coli* and the like facilitates the recovery of spacies of Stereptomyces and the like from the soil samples.

This use of thermycetin is illustrated by the following test:

A 15 ml. base layer of nutrient agar of the following composition was poured into petri plates; 10 g./l. glucose, 1 g./l. asparagine, 0.5 g./l. yeast extract (Difco), 100 mg./l. $K_2HPO_4$, 500 mg./l. $MgSO_4$, 100 mg./l. pimaricine (an antifungal agent), 20 mg./l. actidione and 25 g./l. agar. To one set of plates was added 50 mg./l. thermycetin while a second set was used as a control. The plates were then inoculated with soil diluations of $10^{-2}$, $10^{-3}$ and $10^{-4}$ of soil No. 1465, a blended composite of 300 soils, in 5 ml. of agar (2.5%). The results of these tests are summarized by the following data showing the average number of isolatable actinomycetes colonies in each dilution series:

| Soil Dilution | Control | Thermycetin |
|---|---|---|
| $10^{-2}$ | none | none |
| $10^{-3}$ | 6 | 38 |
| $10^{-4}$ | 6 | 14 |

As is apparent from these results, it was possible to isolate significantly more actinomycetes from the plates containing the thermycetin than from the control plates.

Various changes and modifications of the invention can be made and, to the extent that such variations incorporate the spirit of this invention, they are intended to be included within the scope of the appended claims.

We claim:
1. A member of the group consisting of thermycetin and its salts, said thermycetin being characterized by the following properties:
   a. crystallizing in the form of white platelets melting at about 152–154° C. uncorrected with decomposition on the hot stage,
   b. soluble in aqueous alkaline solutions, organic bases, dioxane, glacial acetic acid, and formamide; partly soluble in methanol, acetone, ethyl acetate, butanol, amyl acetate, and methyl isobutyl ketone; and insoluble in water, petroleum ether, and benzene,
   c. gives a positive color test with Tollen's reagent and with dinitrophenylhydrazine,
   d. infrared absorption spectrum having characteristic peaks at the following wave lengths expressed in microns: 2.9–4.0 (broad), 6.01, 6.12, 6.28, 6.46 (shoulder), 6.52, 6.82, 7.02, 7.57, 7.75, 7.97, 8.16, 8.30 (shoulder), 8.55, 8.79, 9.06 (shoulder), 9.66, 10.07, 10.37, 10.92, 11.14, 11.75, 12.80, 13.44, (broad), and 4.3,
   e. containing the elements carbon, hydrogen, nitrogen, and oxygen and having the molecular formula $C_{11}H_{13}N_4O_9$, and
   f. characteristic ultraviolet absorption spectrums and molecular extinction coefficients, respectively of

$3030_{max}$. A., $E^{1\%}_{1\,cm.}=1178$, $2790_{inf}$. A., $E^{1\%}_{1\,cm.}=999$,
$2330_{max}$. A., $E^{1\%}_{1\,cm.}=574$ in 0.1 N hydrochloric acid;

3020 A., $E^{1\%}_{1\,cm.}=944$, 2730 A., $E^{1\%}_{1\,cm.}=890$, 2240 A., $E^{1\%}_{1\,cm.}=697$ in 0.1 M pH 7.0 phosphate buffer; and 2570 A., $E^{1\%}_{1\,cm.}=1420$ after 1 hour in 0.1 N sodium hydroxide.

2. Thermycetin as defined in claim 1.
3. Salts of thermycetin as defined in claim 1.
4. The process for the preparation of thermycetin which comprises growing a thermycetin-producing strain of Streptomyces under aerobic conditions in an aqueous nutrient medium until substantial antibiotic activity is imparted to said medium.
5. The process of claim 4 wherein the microorganism is Streptomyces NRRL 2824.
6. The process for the preparation of thermycetin which comprises growing a thermycetin-producing strain of Streptomyces under aerobic conditions in an aqueous nutrient medium containing assimilable sources of carbon and nitrogen, and recovering thermycetin from the fermentation broth.
7. The process of claim 6 wherein the microorganism is Streptomyces NRRL 2824.
8. The process which comprises growing Streptomyces NRRL 2824 under aerobic conditions in a nutrient medium containing soybean meal, dextrose and distillers' solubles, and recovering thermycetin from the resulting fermentation broth.
9. The process of claim 8 wherein the antibiotic is recovered by processes comprising filtering the acidified fermentation broth, extracting the filtrate with a suitable immiscible solvent, and recovering thermycetin from the solvent extracts.
10. In the process of recovering thermycetin from fermentation broths, the steps which comprise acidifying a fermentation broth containing thermycetin to a pH of about 3.0, filtering the acidified fermentation broth, extracting the filtrate with an immiscible solvent, and recovering thermycetin from the solvent extracts.
11. The process of claim 10 wherein the solvent is ethyl acetate.

References Cited in the file of this patent
UNITED STATES PATENTS
2,982,689    Donovick et al. _____ May 2, 1961